United States Patent [19]
Mori et al.

[11] 3,952,318
[45] Apr. 20, 1976

[54] SHUTTER CONTROL CIRCUIT FOR CAMERAS

[75] Inventors: Chiharu Mori; Masahiro Kawasaki; Hirokazu Ando, all of Tokyo, Japan

[73] Assignee: Asahi Kogaku Kogyo Kabushiki Kaisha, Tokyo, Japan

[22] Filed: Oct. 9, 1974

[21] Appl. No.: 513,294

[30] Foreign Application Priority Data
Oct. 9, 1973 Japan............................. 48-113691

[52] U.S. Cl................................. 354/51; 354/60 R
[51] Int. Cl.².................... G03B 7/08; G01J 1/44
[58] Field of Search...................... 354/50, 51, 60 R

[56] References Cited
UNITED STATES PATENTS

| | | |
|---|---|---|
| 3,670,637 | 6/1972 | Mori .................. 354/51 X |
| 3,690,230 | 9/1972 | Mori et al. .......................... 354/60 X |
| 3,736,851 | 6/1973 | Ono ....................................... 354/51 |
| 3,781,551 | 12/1973 | Mori ................................. 354/50 X |
| 3,836,921 | 9/1974 | Mori ................................. 354/51 X |
| 3,848,986 | 11/1974 | Nuiyahowa et al. ................... 354/51 |

*Primary Examiner*—Joseph F. Peters, Jr.
*Attorney, Agent, or Firm*—Steinberg and Blake

[57] ABSTRACT

An electrical system to be used in a camera for controlling exposure time. The electrical system includes a pair of substantially identical constant voltage sources respectively having inputs connected together. A buffer circuit is coupled between an interconnection of these inputs and the collector of a compression transistor to which a photosensitive means is connected and whose base is coupled to one of the constant voltage sources. A timing circuit is coupled to an expansion transistor, whose base is coupled to the other of the constant voltage sources.

13 Claims, 5 Drawing Figures

SHUTTER CONTROL CIRCUIT FOR CAMERAS

BACKGROUND OF THE INVENTION

The present invention relates to cameras.

In particular, the present invention relates to a shutter control system for cameras.

As is well known, electric shutter control circuits, especially for use in single lens reflex cameras, are strongly affected by variations in the source voltage as well as by variations caused by changes in the ambient temperature. It has been proposed to provide a circuit for stabilizing the operation of a shutter control circuit and eliminate the effect of such variations. However, the proposed circuit is disadvantageous since it is necessary to utilize in a practical construction circuits which are complicated and increase the power consumption as well as the cost of the electrical system, with operation problems occurring frequently.

SUMMARY OF THE INVENTION

It is accordingly a primary object of the present invention to provide an improved electrical system for controlling the exposure time.

In particular, it is an object of the present invention to provide an electrical system for camera shutter control which utilizes a simplified circuit with a reduced number of electronic circuit components, thereby reducing power consumption and reducing the possibility of operational difficulties.

In particular, it is an object of the present invention to provide an electronic system for a camera shutter which provides stabilized operation against variations in the ambient temperature as well as variations in the source voltage.

Thus, it is an object of the present invention to provide a system of the above type which is as accurate as previously known similar systems, while at the same time being simpler in its construction and more reliable in its operation.

According to the invention, the electrical system includes a pair of constant voltage source means having inputs coupled together. A buffer circuit means is connected between the interconnection of these inputs and the collector of a compression transistor which is coupled to a photosensitive means and whose base is coupled to one of the constant voltage source means. A timing circuit means is coupled to an expansion transistor whose base is coupled to the other constant voltage source means.

BRIEF DESCRIPTION OF DRAWINGS

The invention is illustrated by way of example in the accompanying drawing which forms part of this application and in which.

DESCRIPTION OF THE PREFERRED EMBODIMENTS

Figure 2:
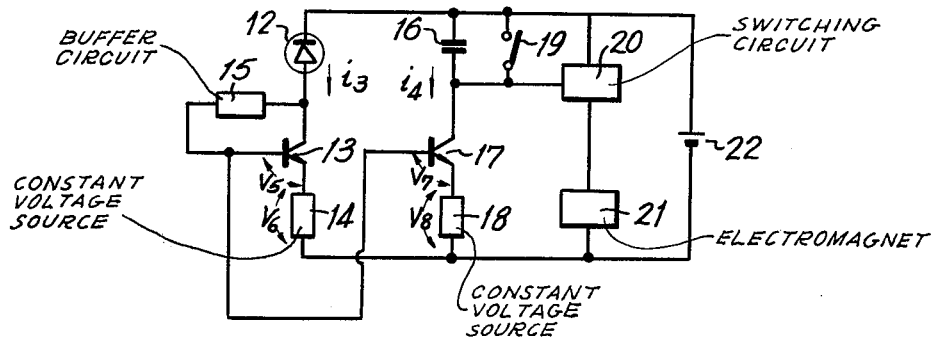
FIG. 2 is a circuit diagram of a prior art electric shutter control circuit.

Referring first to FIG. 2, there is shown a previously proposed electric system for a camera control. A photosensitive means is formed by a light receiving element 12, such as a photodiode, having a photoelectric conversion characteristic and producing a current $i_3$ which is proportional to the light at the object. A transistor 13 is connected in series with the light receiving element 12 and has the current $i_3$ passing into its collector. Transistor 13 serves as a compression transistor, and due to the base-emitter PN junction of the transistor, develops a base-emitter voltage $V_5$ thereacross which is proportional to the APEX (Additive Systems of Photographic Exposure) indication value $B_v$ of the luminance of a subject B which is being photographed. Transistor 13 receives its bias current through a buffer circuit 15 interconnected between the base and collector of transistor 13. A constant voltage source 14 is connected in the emitter circuit of transistor 13 and provides a voltage $V_6$ which can be set to a level proportional to exposure determining factors, such as the lens diaphragm aperture value $A_v$ and the film sensitivity $S_v$. Source 14 must be arranged so as not to be influenced be photoelectric current $i_3$.

The voltage $V_6$ is set at a level proportional to $(S_v - A_v)$ which is the algebraic sum of the APEX indication values $A_v$, representing the lens diaphram aperture, and $S_v$ representing the film sensitivity. The combined voltages $V_5 + V_6$ will provide a value of $B_v + S_v - A_v$, which is the APEX indication value $T_v$ of the exposure time T.

An expansion transistor 17 has a constant voltage source 18 connected in its emitter circuit and has its base interconnected with the base of transistor 13. The constant voltage source 18 produces a voltage $V_8$ which is set, such that a timing current $i_4$ is developed in the collector of transistor 17, wherein the current $i_4$ will correspond to the value $T_v$. The voltage $V_8$ is set to take into consideration a relationship between the base emitter voltage $V_7$ of the transistor 17 and the output of collector current of that transistor. Constant voltage source 18 must be arranged so as not to be influenced by current $i_4$. The timing current $i_4$ charges a timing capacitor means 16 when a switch 19 thereacross, is opened. As is well known, switch 19 is opened in synchronism with the opening of the shutter. A switching circuit 20 is connected to the capacitor 16 and is coupled to an electromagnet 21. The source voltage 22 is connected in parallel across the series combination of capacitor 16, switching circuit 20 and electromagnet 21. When the voltage across the capacitor 16 reaches a predetermined value, the switching circuit 20 operates to activate the electromagnet 21, thereby releasing the shutter which closes to terminate the exposure. Assuming that the electric current of the expansion transistor 17 is maintained at a constant level without being influenced by the voltage variation of the power source 22, then it will be possible to impart an ability of treating the exposure determining factors such as $A_v$, $S_v$, etc. by the constant voltage source 18 and no problem will arise in this connection.

Thus, in the circuit arrangement of FIG. 2, it is essential that the voltages $V_6$ and $V_8$, provided by the constant voltage sources 14 and 18, should not be influenced by the current $i_3$ and $i_4$, respectively. Although it is not very difficult both theoretically and technically to obtain such constant voltage sources, the incorporation of such constant voltage sources will necessarily complicate the circuit construction, thereby causing some secondary troubles and increasing the power consumption of the device because of an increased number of circuit elements employed.

As is referred hereinbefore the present invention intends to eliminate disadvantages involved in the prior art shutter control circuit and provide an improved circuit arrangement having a simplified construction and a reduced power consumption.

Figure 1:
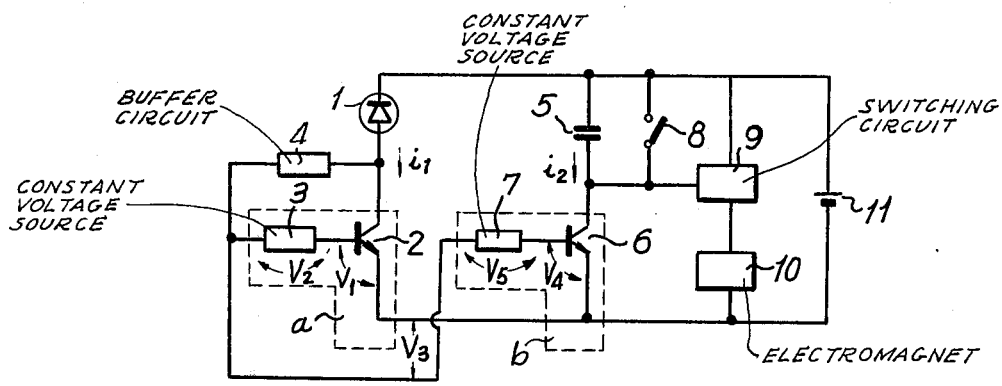
FIG. 1 is a circuit diagram which represents the basic arrangement of the electric system in accordance with the present invention.

In FIG. 1, there is shown a circuit diagram of the fundamental arrangement of the present invention.

Referring now to FIG. 1, there is shown a circuit $a$ which includes a compression transistor 2 having a constant voltage source means 3 coupled to the base thereof. A second circuit $b$ includes an expansion transistor 6 with a constant voltage source means 7 connected to the base thereof. The two source means 3 and 7 are interconnected at their inputs. A buffer circuit means 4 is connected to the junction at the interconnection of the two constant voltage source means and to the collector of the transistor 2. A photosensitive means or light receiving element 1 is connected to the collector of compression transistor 2 and has a photoelectric conversion characteristic which produces an electric current proportional to the illumination of the object being measured. The light receiving element 1 may be, for example, any suitable photodiode. Transistor 2 operates as a compression transistor which receives the electric current from the light receiving element 1 and develops across its base and emitter a voltage proportional to the value of the photoelectric current. Bias current for the compression transistor 2 is applied from the collector to the base of that transistor by way of the buffer circuit means 4 and the constant voltage source means 3.

A timing capacitor 5 is connected to the collector of transistor 6, which operates as an expansion transistor. Thus, expansion transistor 6 has a collector connected to timing capacitor 5 and an emitter connected to the emitter of the compression transistor 2. The base of the expansion transistor 6 is connected between the buffer circuit 4 and constant voltage source 3 by way of the second constant voltage source 7. A normally closed timing switch 8 is connected in parallel with the timing capacitor 5 such that when the timing switch 8 opens, capacitor 5 can be charged with the current going through the collector of transistor 6. A switching circuit 9, in series with an electromagnet 10, is connected to the capacitor 5 with a voltage source 11 connected in parallel thereacross When the capacitor 5 reaches a preselected voltage level, the switching circuit 9 operates the electromagnet 10 to close the shutter. The pair of voltage source means 3 and 7 are substantially identical.

The operation of the circuit shown in FIG. 1 is as follows: Upon application of a bias current from the collector to the base of transistor 2 through the buffer circuit 4 and the constant voltage source 3, transistor 2 develops across its base and emitter a voltage $V_1$ which corresponds to $B_v$, representing the APEX indication of the luminance of the object B. The voltage $V_1$ is obtained by compressing the photoelectric current $i_1$. The voltage $V_2$, which is developed across the terminals of the source means 3, is set depending upon exposure determining factors such as APEX index values $A_v$ and $S_v$, which corresponds to the lens diaphragm A and the film sensitivity S.

Thus, the voltage $V_2$ represents the quantity $(S_v - A_v)$, and the value $V_3$ will be at a level proportional to $B_v + S_v - A_v$, because of the relationship $V_3 = V_1 + V_2$. However, this value is equal to $T_v$, which is the APEX index value of the exposure time T. The voltage $V_3$ is applied across the base and emitter of the expansion transistor 6, through the constant voltage source means 7. The voltage across the base emitter of the transistor 6 is defined as $V_4$, wherein $V_4 = V_3 - V_5$. The expansion transistor 6 is adapted to develop a timing current $i_2$ in its collector, which charges the timing capacitor 5 and which corresponds to preset voltage $T_v$. The base emitter voltage $V_5$ of the source means 7 is determined based upon the relationship between the voltage across the base emitter junction of transistor 6, $V_4$, and the output or collector current of the transistor 6. In this manner, the timing current $i_2$ which is obtained, and which determines $T_v$, is based upon the circuit design characteristics. The current charges the capacitor 5 until a predetermined voltage level is reached, whereupon the switching circuit 9 operates the electromagnet 10 to close the shutter of the camera.

Figure 3:
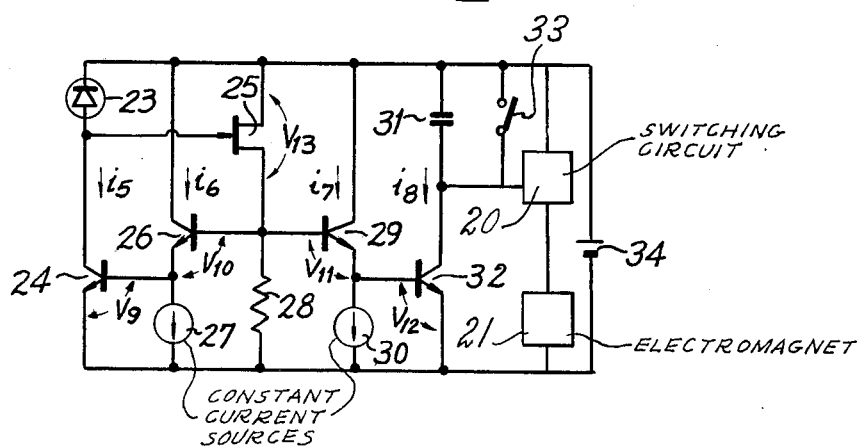
FIGS. 3–5 are circuit diagrams showing various embodiments for carrying out the fundamental arrangement of the electric system shown in FIG. 1.

Referring now to FIG. 3, there is shown a circuit diagram of one embodiment of the circuit arrangement shown generally in FIG. 1. A light receiving element 23, such as a photodiode, is connected in the collector circuit of a compression transistor 24 which compresses the photoelectric current $i_5$ produced by the light receiving element 23. The compression transistor 24 is so arranged that the photoelectric current $i_5$ develops across the base and emitter of the transistor 24 a voltage $V_9$ which is proportional to the APEX indication value $B_v$ of the luminance of the subject B. The buffer circuit means is formed by an FET 25 which supplies transistor 24 with a bias current. The constant voltage source means 3 includes in FIG. 3 the transistor 26 having a constant current source 27 serially connected in its emitted circuit. Transistor 24 will receive bias current through the arrangement including the buffer circuit formed by the FET 25 and the transistor 26, to develop a collector current equal to the photoelectric current $i_5$. A second constant voltage source means corresponding to means 7 is composed of transistor 29 and constant current source 30 and has its input terminal, represented by the base of transistor 29, coupled to the base of the transistor 26 as well as to the source or output terminal of the FET 25. The output or emitter of the transistor 29 is connected to an expansion transistor 32.

Thus, the constant curren source 27 current the base-emitter voltage $V_{10}$ of the transistor 26 by varying the current flowing therethrough (approximately equal to the collector current of the transistor 26) and makes base-emitter voltage $V_{10}$ correspond to the exposure determining factors such as $A_v$, $S_v$, etc. Transistor 29 and a constant current source 30 have, in combination, a function essentially similar to that of the combination of the transistor 26 and constant current source 27. The combination of the transistor 29 and constant current source 30 serves also as a constant voltage source for expansion transistor 32 so that the base-emitter voltage $V_{12}$ of the transistor 32 derives a timing current $i_8$ which corresponds to $T_v$ predetermined depending on the circuit design. The exposure determining factors can be processed by use of such a circuit consisting of these transistors and constant current sources and no problem is involved therein. Assuming that the transistors 24, 26, 29 and 32 of FIG. 3 have equal electric characteristics, then the following relations will be obtained:

$$V_9 = \frac{kT}{q}\log\frac{i_5}{I_s} + V_0 \quad (1)$$

$$V_{10} = \frac{kT}{q}\log\frac{i_6}{I_s} + V_0 \quad (2)$$

$$V_{11} = \frac{kT}{q}\log\frac{i_7}{I_s} + V_0 \quad (3)$$

$$V_{12} = \frac{kT}{q}\log\frac{i_8}{I_s} + V_0 \quad (4)$$

where,
$k$: Botzmann's constant, $1.38054 \times 10^{-23}$ [J/°K]
$q$: elementary electric charge, $1.6021 \times 10^{-19}$ [C]
$I_s$: backward saturation current of the transistor
$T$: absolute temperature [°K]
$V_0$: $V_n$ at the time of $i_n = I_s$ It will be understood from FIG. 3 that the following relation is satisfied:

$$V_9 = V_{10} = V_{11} + V_{12} \quad (5)$$

Substituting Formulas (1), (2), (3) and (4) into (5), then the following relation will be obtained:

$$i_5 \times i_6 = i_7 \times i_8$$

therefore $$i_8 = \frac{i_6}{i_7} \times i_5 \quad (6)$$

It is apparent from the Formula (6) that the timing current $i_8$ is proportional to the photoelectric current $i_5$. The timing current $i_8$ is also proportional to $i_6$ and inversely proportional to $i_7$ and, therefore, $i_6$ and $i_7$ can be used satisfactorily in the photographic photometric operation so long as these currents are set in such a manner that their variations correspond to the diaphragm aperture value F and ASA-number. The current $i_8$ produced by the transistor 32 will be used to charge the timing capacitor 31 when the timing switch 33 is opened. The voltage 34 is utilized as the voltage source.

Figure 4:
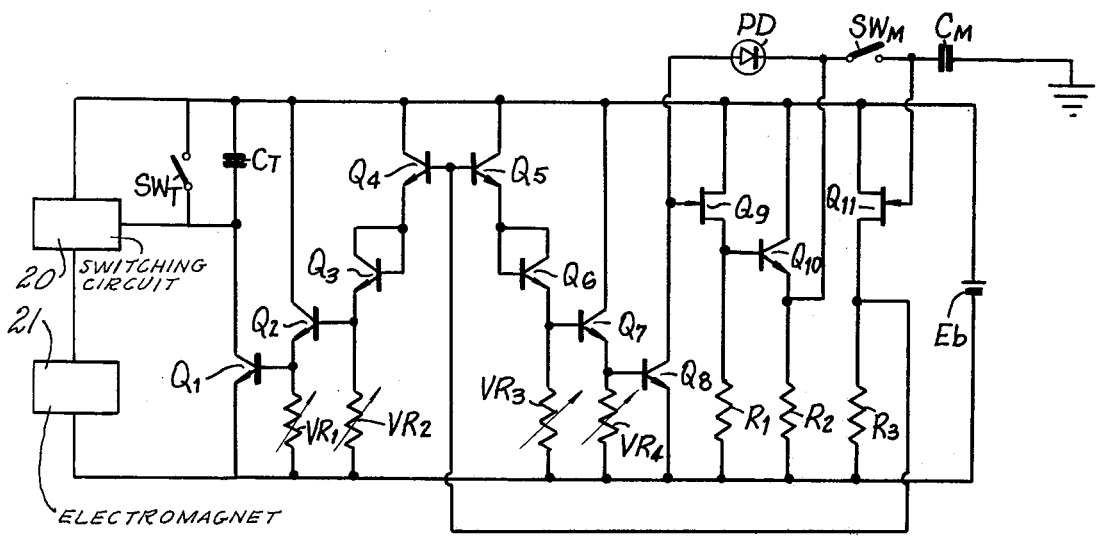

Referring now to FIG. 4 there is shown another embodiment of a circuit which carries out the general circuit arrangement shown in FIG. 1. In FIG. 4, the compression transistor $Q_8$ has the photodiode PD serially connected to its collector. Transistor $Q_1$ serves as the expansion transistor and has the timing capacitor $C_T$ and timing switch $SW_T$ coupled to its collector circuit.

The pair of constant voltage source means each include a cascaded arrangement of transistors. In one constant voltage source means, corresponding to means 7 of FIG. 1, output transistor $Q_2$ is coupled to the base of transistor $Q_1$ and includes a variable resistor $V_{R1}$ in its emitter circuit. A diode-connected transistor $Q_3$ is coupled to the base of transistor $Q_2$. An input transistor $Q_4$ is coupled to the base of the diode-connected transistor $Q_3$. A variable resistor $V_{R2}$ is connected in the emitter circuit of the diode-connected transistor $Q_3$. In a similar manner the transistors $Q_5$, $Q_6$ and $Q_7$ as well as variable resistors $V_{R3}$ and $V_{R4}$ serve as the other constant voltage source means coupled to the transistor $Q_8$ and corresponding to the constant voltage source means 3 in FIG. 1. A transistor $Q_2$ and a variable resistor $VR_1$ as well as a transistor $Q_7$ and a variable resistor $VR_2$ are emitter-follower connected to form buffer circuits, respectively. Transistors $Q_3$ and $Q_6$ are provided for the purpose of $\gamma$-correction for the F-value and ASA-number converting variable resistors.

Thus, in both emitter follower circuit sections, the emitter currents are determined by setting respectively, the resistances of variable resistors $V_{R2}$ and $V_{R3}$ in accordance with exposure factors such as lens diaphragm value and film sensitivity. Thus, each of the emitter follower circuit sections can be utilized to set a particular exposure determining factor. The variations of the resistance characteristics of the variable resistors $V_{R2}$ and $V_{R3}$ with the variation in the exposure determining factors, is compensated by means of the diode connected transistors $Q_3$ and $Q_6$. The other remaining transistor and resistor of each section, namely transistor $Q_2$ and resistor $V_{R1}$ on the one hand, as well as the transistor $Q_7$ and variable resistor $V_{R4}$ on the other hand, are operative as a buffer circuit, as mentioned previously.

The electric circuit of the present invention could easily be utilized in conjunction with a single lens reflex camera by the inclusion of a memory capacitor and a memory switch. In FIG. 4 there is shown the inclusion of a memory capacitor $C_M$ as well as a switch $SW_M$, shown as being included within the buffer circuit. The buffer circuit includes the field effect transistors $Q_9$ and $Q_{11}$ as well as the interconnecting transistor $Q_{10}$ and the resistors $R_1$, $R_2$ and $R_3$, connected in the output circuits of the aforementioned FETs and interconnecting transistor. Thus components $Q_9$ and $R_1$, components $Q_{10}$ and $R_2$, and components $Q_{11}$ and $R_3$ respectively form three series circuits which are parallel connected, as shown.

This buffer circuit means supplies the bias current from the collector to the base of the compression transistor $Q_8$. The gate of the FET $Q_9$ is coupled to the collector of the transistor $Q_8$, the emitter of the transistor $Q_{10}$ being connected to one end of the photodiode PD. The gate of the transistor $Q_{11}$ is connected to the memory capacitor $C_M$. The other end of the memory capacitor $C_M$ is connected to ground. The interconnection between the resistor $R_3$ and the FET $Q_{11}$ is coupled to the junction between the bases of input transistors $Q_4$ and $Q_5$. Utilizing the arrangement as shown in FIG. 4, the light quantity measured by the circuit is stored in the memory capacitor $C_M$ just prior to the swinging up of the mirror in a single lens reflex camera. In the circuit of FIG. 4, the light receiving photoelectric element could be either a photodiode or a suitable photoconductor element such as a CdS.

Figure 5:
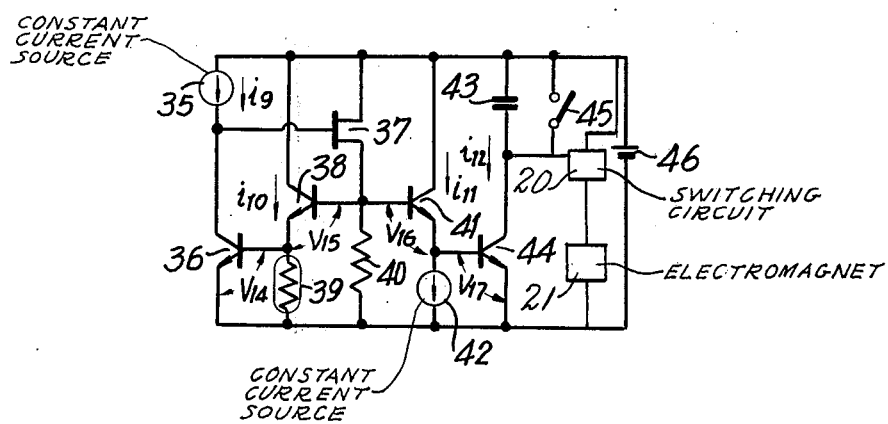

Referring now to FIG. 5, there is shown a further embodiment of the circuit arrangement of the present invention. In this embodiment, the light receiving photoconductor element 39 and the constant current source 35 are interchanged as compared with the location of corresponding components 27 and 23 in FIG. 3. In other respects, the circuit is similar to that of FIG. 3. In FIG. 5, if the current $i_9$ of the constant current source 35 is present to a value corresponding to various exposure determining factors such as the lens diaphragm value and the film sensitivity value, then the base-emitter voltage $V_{14}$ of the transistor 36 can be set so that its collector current equals the current $i_9$ from source 35. This can be achieved by providing the proper bias current to the base of the transistor 36 by way of the buffer circuit means formed by the FET 37. (In the circuit employing a photoconductor element such as a CdS, said FET 37 may be substituted by any other equivalent device.) The voltage $V_{14}$ developed across the base-emitter of transistor 36 will then correspond or be proportional to $S_v - A_v$.

When the base-emitter voltage $V_{14}$ of transistor 36 is determined, the voltage across the terminals of the photoconductor element 39 reaches a constant level $V_{14}$ and the electric current $i_{10}$ flowing through the light receiving element 39 reaches an amount proportional to the luminance of the object being photographed. Since the photoelectric current $i_{10}$ is equal to the collector of the transistor 38, the voltage $V_{15}$ is developed across the base and emitter of the transistor 38 by way of the buffer circuit, etc. and will have a level proportional to $B_v$. The terminal voltages $V_{14}$ and $V_{15}$ across the resistor 40 will be equal to $B_v + S_v - A_v$, with base emitter voltage $V_{16}$ across the transistor 41 set by the electric current from the constant current source 42 at a level wherein the collector current of the transistor 44 becomes equal to the timing current $i_{12}$ which corresponds to the preset value $T_v$. The base-emitter voltage $V_{17}$ of the transistor 44 will then correspond to the value $T_v$ and the timing current $i_{12}$ will then be proportional to the luminance of the object being photographed and will be obtained as a value inversely proportional to exposure time T.

In the circuit of FIG. 5, a photoconductor element, such as a CdS, was utilized as the light receiving element 39. The FET 37 could therefore be substituted by any other equivalent device providing a high impedance buffer circuit. Furthermore, while in the described embodiment the photoconductor element was arranged in the location of constant voltage source means 3, it could also be arranged in place of constant voltage source means 7 or in fact could be replaced with the light receiving element 1.

In the foregoing described circuit, the electric system for shutter control has been provided which is a simplified circuit construction including a considerably reduced number of circuit components which therefore reduce the possiblity of troubles during operation as well as reducing the power of consumption of the device. The operation section of the circuit has a symmetrical circuit configuration so that the device provides stabilized operations against the variations in ambient temperature as well as source voltages. Since the total voltages $V_9$, $V_{10}$, and $V_{13}$ (or $V_{11}$, $V_{12}$, and $V_{13}$) are used as the source voltage, these individual voltages can be set at a sufficiently low level.

The embodiment can easily be utilized (FIG. 4) for a single lens reflex camera by the inclusion of a memory section as has been described. Furthermore, the photoelectric element could either be a photodiode or could easily substituted by a photoconductor element, such as CdS.

What is claimed is:

1. In an electrical system to be used in a camera for automatically determining exposure time, compression and expansion transistors and electrically connected therebetween electrical circuitry including photosensitive means, for providing an electrical quantity corresponding to light at the object to be photographed, and a pair of substantially identical constant voltage source means at least one of which is electrically connected to the base of at least one of said transistors, the other of said pair of constant voltage source means and said photosensitive means forming a pair of means one of which is electrically connected with the base of the other of said transistors and the other of which is electrically connected to the collector of said other transistor, and timing capacitor means electrically connected with said expansion transistor to be charged with a timing current.

2. The combination of claim 1 and wherein said transistors respectively have emitters coupled to each other.

3. In an electrical system to be used in a camera for automatically determining exposure time, compression and expansion transistors and electrically connected therebetween electrical circuitry including photosensitive means, for providing an electrical quantity corresponding to the light at the object to be photographed, and a pair of substantially identical constant voltage source means, and timing capacitor means electrically connected with said expansion transistor to be charged with a timing current, said pair of voltage source means being respectively coupled to bases of both transistors, both of said source means having inputs connected together at a junction therebetween, buffer circuit means coupled to said junction and to the collector of said compression transistor and adjustable means coupled at least to one of said source means for introducing an electrical quantity corresponding to an exposure factor such as diaphragm aperture or film speed.

4. The combination of claim 1 and wherein said photosensitive means is coupled to the collector of said compression transistor.

5. In an electrical system to be used in a camera for automatically determining exposure time, compression and expansion transistors and electrically connected therebetween electrical circuitry including photosensitive means, for providing an electrical quantity corresponding to light at the object to be photographed, and a pair of substantially identical constant voltage source means respectively coupled to the bases of said transistors, and timing capacitor means electrically connected with said expansion transistor to be charged with a timing current, said pair of source means respectively including source transistors respectively having emitters coupled to the bases of said compression and expansion transistors, and said bases of said source transistors being interconnected.

6. The combination of claim 3 and wherein said adjustable means includes a variable resistor.

7. The combination of claim 5 and wherein said circuitry includes a buffer circuit means which includes an FET having its source-drain circuit coupled to the interconnected bases of said source transistors and having its gate coupled to the collector of said compression transistor.

8. In an electrical system to be used in a camera for automatically determining exposure time, compression and expansion transistors and electrically connected therebetween electrical circuitry including photosensitive means, for providing an electrical quantity corresponding to light at the object to be photographed, and a pair of substantially identical constant voltage source means respectively connected with bases of said transistors, and timing capacitor means electrically connected with said expansion transistor to be charged with a timing current, said pair of source means respectively including output transistors respectively having emitters coupled to the bases of the compression and expansion transistors, variable resistors coupled respectively to the emitters of said output transistors, a pair of diode-connected transistors respectively having emitters coupled to the bases of said output transistors, a pair of input transistors respectively having emitters coupled to the bases of said diode-connected transistors, and additional variable resistors coupled to the emitters of the diode-connected transistors, and the bases of said input transistors being interconnected at a junction forming an input of the pair of source means.

9. The combination of claim 3 and wherein said buffer circuit means comprises three parallel-connected series circuits two of which respectively include FETs respectively having resistors in series with the source drain paths thereof and the third of which includes a transistor and a resistor in series with the emitter-collector path thereof, said photosensitive means being coupled to the base of one of said FETs and to the collector of said compression transistor, the base of the transistor of said third series circuit being coupled to an interconnection of said one FET and the resistor in series therewith, the emitter of the latter transistor being coupled to the other side of the photosensitive means, a memory switch and a memory capacitor in series with the photosensitive means, the gate of the other FET being coupled to one side of the memory capacitor, and an interconnection of said other FET and the resistor in series therewith being coupled to said junction between said inputs of said pair of constant voltage source means.

10. The combination of claim 1 and further comprising a switching circuit coupled to said timing capacitor means for producing an electrical signal when the voltage across said timing capacitor means reaches a predetermined value, and electromagnetic means for operating a camera shutter when said predetermined value is reached.

11. In an electrical system to be used in a camera for automatically determining exposure time, compression and expansion transistors and electrically connected therebetween electrical circuitry including photosensitive means, for providing an electrical quantity corresponding to light at the object to be photograhed, and a pair of substantially identical constant voltage source means one of which is connected at least in part to the collector of said compression transistor and the other of which is connected to the base of said expansion transistor, and timing capacitor means electrically connected with said expansion transistor to be charged with a timing current, a part of said one of said pair of constant voltage source means being electrically connected with the collector of said compression transistor while the remainder of said one constant voltage source means and said photosensitive means are electrically connected to the base of one of said transistors.

12. The combination of claim 11 and wherein said remainder of said one source means and said photosensitive means are electrically connected to the base of said compression transistor.

13. In an electrical system to be used in a camera for automatically determining exposure time, compression and expansion transistors and electrically connected therebetween electrical circuitry including photosensitive means, for providing an electrical quantity corresponding to light at the object to be photographed, and a pair of substantially identical constant voltage source means respectively coupled to the bases of both transistors, both of said source means having inputs connected together at a junction therebetween, and buffer circuit means coupled to said junction and to the collector of said compression transistor.

* * * * *